United States Patent
Lin et al.

(10) Patent No.: US 9,066,206 B2
(45) Date of Patent: Jun. 23, 2015

(54) SYSTEM AND METHOD FOR PROVIDING DYNAMIC SUPPLY POSITIONING FOR ON-DEMAND SERVICES

(71) Applicant: Uber Technologies, Inc., San Francisco, CA (US)

(72) Inventors: Hungyu Henry Lin, Saratoga, CA (US); Travis Cordell Kalanick, San Franciswco, CA (US); Emily Wang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 176 days.

(21) Appl. No.: 13/836,993

(22) Filed: Mar. 15, 2013

(65) Prior Publication Data

US 2014/0011522 A1   Jan. 9, 2014

Related U.S. Application Data

(60) Provisional application No. 61/667,536, filed on Jul. 3, 2012.

(51) Int. Cl.
*H04W 24/00* (2009.01)
*H04W 4/02* (2009.01)
*G06Q 30/02* (2012.01)
*G06Q 50/10* (2012.01)

(52) U.S. Cl.
CPC ........... *H04W 4/023* (2013.01); *G06Q 30/0205* (2013.01); *G06Q 50/10* (2013.01)

(58) Field of Classification Search
CPC ....... H04W 4/02; H04W 4/021; H04W 4/023; H04W 4/025; G06Q 50/10; G06Q 50/28; G06Q 50/30

USPC .......... 455/404.2, 456.1, 456.2, 456.3, 456.5, 455/456.6, 457; 705/7.34, 13, 14.53, 14.54, 705/14.58

See application file for complete search history.

(56) References Cited

U.S. PATENT DOCUMENTS

| | | | |
|---|---|---|---|
| 2009/0030749 A1* | 1/2009 | Drummond et al. | 705/7 |
| 2013/0144831 A1* | 6/2013 | Atlas | 706/50 |
| 2014/0257681 A1* | 9/2014 | Kummamuru et al. | 701/117 |

FOREIGN PATENT DOCUMENTS

| | | | |
|---|---|---|---|
| JP | 2007249918 A | * | 9/2007 |
| JP | 2011/108194 A | | 6/2011 |

(Continued)

OTHER PUBLICATIONS

International Search Report and the Written Opinion as issued in corresponding application PCT/US2013/048257, dated Oct. 22, 2013.

(Continued)

Primary Examiner — Magdi Elhag
(74) Attorney, Agent, or Firm — Mahamedi Paradice LLP

(57) ABSTRACT

A method for providing on-demand service information is provided. One or more processors determine, for a given geographic region, position information for each of a plurality of requesters for an on-demand service and position information for each of a plurality of service providers that can provide the on-demand service. A plurality of sub-regions is identified for the given geographic region. Based, at least in part, on the position information of the requesters and the service providers, one or more sub-regions are determined as being under-supplied by the plurality of service providers as compared to one or more other sub-regions. Information identifying the under-supplied sub-regions are provided to one or more service provider devices.

20 Claims, 6 Drawing Sheets

(56) References Cited

FOREIGN PATENT DOCUMENTS

| | | |
|---|---|---|
| KR | 2005/0119239 A | 12/2005 |
| KR | 2008/0044606 A | 5/2008 |
| KR | 2011/0061414 A | 6/2011 |
| WO | WO 2010/123075 A1 | 10/2010 |

OTHER PUBLICATIONS

International Preliminary Report on Patentability dated Jan. 15, 2015.

* cited by examiner

SYSTEM AND METHOD FOR PROVIDING DYNAMIC SUPPLY POSITIONING FOR ON-DEMAND SERVICES

RELATED APPLICATION

This application claims benefit of priority to U.S. Provisional Patent Application No. 61/667,536, filed Jul. 3, 2012; the aforementioned application being incorporated by reference in its entirety.

BACKGROUND

There are many real-world services that a user can access through a mobile computing device. In some examples, a user can request transportation services or delivery services by operating a mobile computing device. The amount of time the user must wait to be serviced can depend on numerous factors.

DETAILED DESCRIPTION

Figure 1:
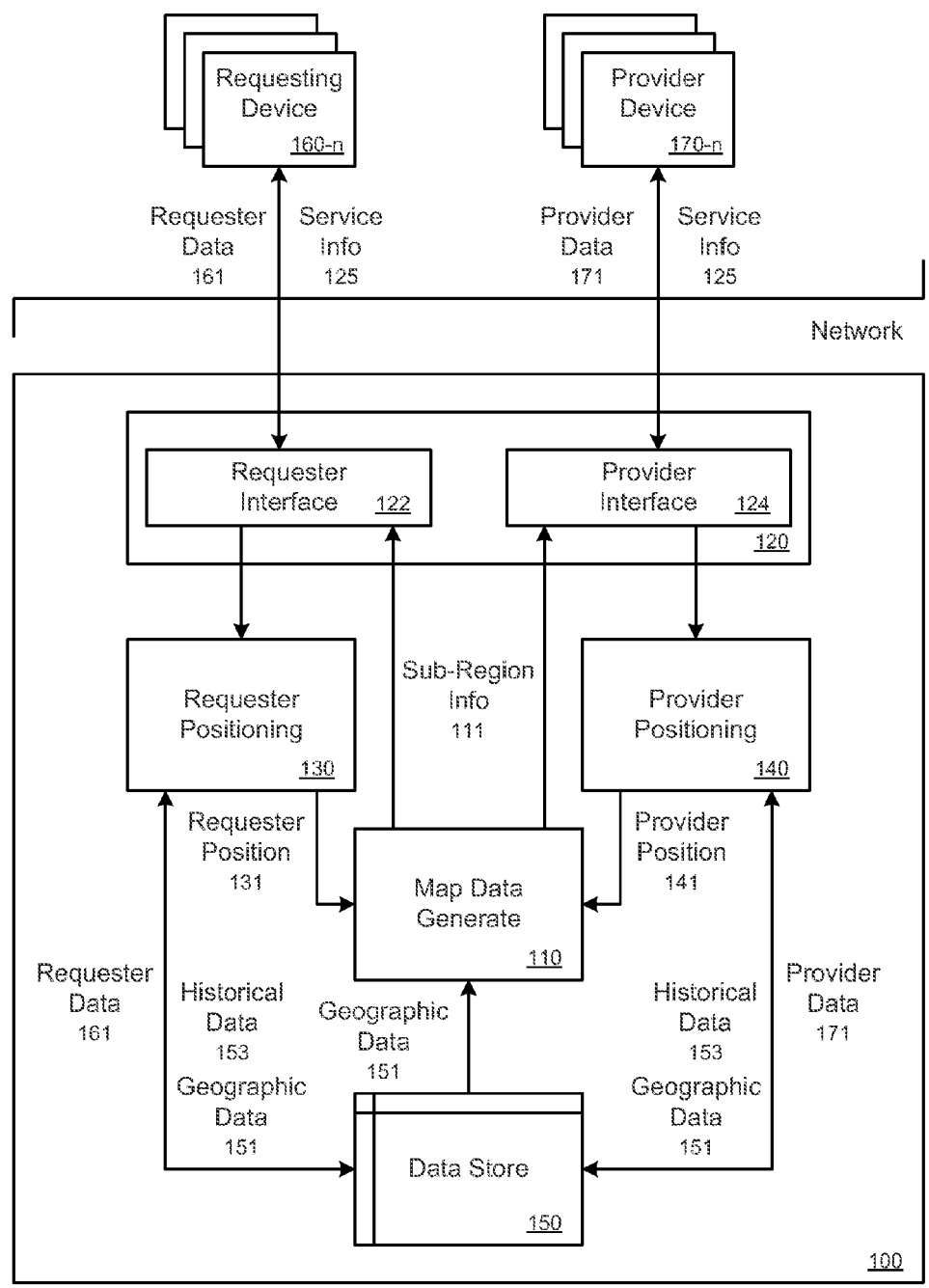
FIG. 1 illustrates an example system for providing on-demand service information.

Examples described herein provide for a system to provide real-time on-demand service information which identifies areas that are under-served or over-served by service providers. Using this information, service providers can maneuver to different positions or areas in a given region in order to provide more efficient service and increase business.

According to some examples, position information for each of a plurality of requesters and for each of a plurality of service providers are determined for a given geographic region. The requesters and services providers can be parties for an on-demand service, such as a transportation service or a delivery service. A plurality of sub-regions is identified for the given geographic region. Based, at least in part, on the position information of the requesters and the service providers, one or more sub-regions can be determined to be under-supplied by the service providers as compared to one or more other sub-regions. Information identifying the under-supplied sub-region(s) can be provided to one or more computing devices associated with the requesters and/or the service providers.

In one example, one or more sub-regions can be determined to be under-supplied by determining, for each of the plurality of sub-regions, an amount of requesters and an amount of service providers in that region. A sub-region can be under-supplied if the ratio of the amount of requesters to the amount of service providers in that region is greater than a threshold ratio.

The information that identifies under-supplied sub-regions and/or over-supplied sub-regions can be provided as visualizations that are to be displayed on one or more computing devices of the requesters and/or service providers. In some examples, the visualizations can be provided in conjunction with a map of the given geographic region that identifies the sub-regions. The visualizations can distinguish sub-regions that are under-supplied from other sub-regions in the given geographic area using different colors (e.g., a color scheme or spectrum) and/or other visual graphics.

In some examples, one or more sub-regions can be determined to be under-supplied by the service providers as compared to one or more other sub-regions by forecasting or making a prediction for a future instance in time (e.g., a time ahead of the current time) that a sub-region will be under-supplied at the future instance in time. Forecasting that a sub-region will be under-supplied can be based, at least in part, on historical data that is comparable to the future instance in time. In this manner, a service provider can, for example, recognize which sub-regions will be under-supplied in the future instance in time (e.g., ten minutes from the current time), and move to a particular location to increase business.

As described herein, a "user," a "requester," or a "customer" are invariably used to refer to individuals that are requesting or ordering a service. Also as described herein, a "provider," a "service provider," a "supplier," or a "vendor" are invariably used to refer to individuals or entities that can provide the service. As an example, a user can request a service, such as a transportation or delivery service (e.g., food delivery, messenger service, food truck service, or product shipping) or an entertainment service (e.g., mariachi band, string quartet) using the system, and a service provider, such as a driver, food provider, band, etc. can communicate with the system and/or the user to arrange for the service. In addition, as described herein, "requesting devices" and "provider devices" refer to computing devices that can correspond to desktop computers, cellular or smartphones, laptop computers, tablet devices, television (IP Television), etc., that can provide network connectivity and processing resources for enabling a user to communicate with a system over a network. A provider device can also correspond to taxi meters or other metering devices.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for providing on-demand service information to one or more computing devices. In some examples, the on-demand service information can identify under-supplied (or under-served) areas to assist service providers in real-time asset positioning. Under-supplied areas (or sub-regions) of a given geographic region can be determined based, at least in part, on position information received from requesters and service providers.

According to implementations, system 100 includes a map data generate 110, a device interface 120, requester positioning 130, and provider positioning 140. System 100 can also include or have access to one or more data stores 150 that store data pertaining to requester computing devices and provider computing device, and geographic data for a plurality of different geographic regions. In one example, the components of system 100 can combine to provide on-demand service information to requesters that request an on-demand service and/or service providers that provide the on-demand service.

System 100 can operate in connection with a service system, which can enable an on-demand service to be arranged between one or more customers (e.g., users who operate one or more requesting devices 160) and one or more service providers (e.g., individuals or entities who operate one or more provider devices 170). Depending on implementation, one or more components of system 100 can be implemented on network side resources, such as on one or more servers. System 100 can also be implemented through other computer systems in alternative architectures (e.g., peer-to-peer networks, etc.).

As an addition or an alternative, some or all of the components of system 100 can be implemented on client devices, such as through applications that operate on the requesting devices 160 and/or provider devices 170. For example, a client application can execute to perform one or more of the processes described by the various components of system 100. System 100 can communicate over a network, via a network interface (e.g., wirelessly or using a wireline), to communicate with the one or more requesting devices 160 and the one or more provider devices 170.

System 100 can communicate, over one or more networks, with requesting devices 160 and provider devices 170 using a device interface 120. In one example, the device interface 120 can include a requester interface 122 and a provider interface 124 that each enables and manages communications between system 100 and the requesting devices 160 and the provider devices 170, respectively.

In some examples, the requesting devices 160 can individually operate an application that can interface with the requester interface 122 to communicate with system 100. Similarly, service providers can individually operate their respective provider devices 170 to use an application (e.g., a different application than the application used by a customer, or the same application) that can interface with the provider interface 124. According to some examples, the applications can include or use an application programming interface (API), such as an externally facing API, to communicate data with the device interface 120. The externally facing API can provide access to system 100 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure system 100 remains secure and only authorized users, service providers, and/or third parties can gain access to system 100.

Using the respective interfaces 122, 124, system 100 can receive requester data 161 from a plurality of requesting devices 160 and provider data 171 from a plurality of provider devices 170. The requester data 161 and the provider data 171 can provide current information about the respective devices and/or their respective users. For example, for each requesting device 160, the requester data 161 can include identification information of the requester or request device (e.g., user name, ID, email address, etc.), a selected pickup location for a transport service or the current position information of the requesting device 160 (e.g., such as global positioning system (GPS) data), whether a request has been made for an on-demand service, service preference (e.g., type of vehicle preferred for transport), and/or the current state of the requesting device 160 (e.g., whether the requester is currently being serviced). Similarly, for each provider device 170, the provider data 171 can include identification information of the service provider or the provider device, the current position information of the provider device 170 (e.g., GPS data), the type of vehicle the service provider drives or the service that the service provider provides, the availability status (the service provider is available for service, is off-duty, or is currently servicing other users), and/or the current state of the provider device 170.

Depending on implementation, the requester data 161 and the provider data 171 can be received at different times. For example, data 161, 171 can be received when a user or service provider launches or starts a service application. This can indicate or represent that a user operating the application on a requesting device is attempting to make (or is potentially interested in making) a request for an on-demand service. In other examples, data 161, 171 can be received when the user or the service provider performs certain actions using the service application (e.g., the user requests a service, or a service provider notifies that he or she is available for providing service). The respective interfaces 122, 124 can also receive data 161, 171 periodically, at different instances in time, or based on a set schedule, once the user or service provider launches or starts the service application. By periodically receiving data 161, 171, for example, real-time position information for the requesters and the service providers can be provided to system 100 (e.g., which can provide updated position information if a requester or provider moves from one area to another).

Each of the requester positioning 130 and the provider positioning 140 can receive the requester data 161 and the provider data 171, respectively, from the device interface 120. The requester positioning 130 can use geographic data 151 stored in the data store 150 and the received requester data 161 to determine, for a given geographic region, the number of requesters in that geographic region and the current position information for a plurality of requesters for an on-demand service in that given geographic region. A geographic region can correspond to any particular designated region (e.g., an area covering a certain radius), a city, a metropolitan area, a county, a state, a country, etc. For example, the given geographic region can be a city, such as San Francisco, Calif., and the geographic region can be defined by a plurality of sub-regions, such as different districts of San Francisco. The requester positioning 130 can determine the current position information for the requesters that are within San Francisco, Calif. based on the requester data 161. In addition, the requester positioning 130 can determine which sub-regions of a given geographic region the requesters are currently located in (e.g., associate the position of a requester with a sub-region).

For example, for each requesting device 160, the requester positioning 130 can use geographic data 151 to determine which geographic region the requesting device 160 is located in. The geographic data 151 can include map data for different geographic regions (e.g., regions in which the on-demand service is offered), as well as information about sub-regions for some of the different geographic regions. In some implementations, a geographic region can be divided into multiple sub-regions having any shape, geometry, or size. The sub-regions can be created or identified (i) arbitrarily, (ii) by an administrator of system 100, and/or (iii) by using predetermined information about certain geographic regions (e.g., some cities have districts that are well-known to the public, or are specifically named and identified by municipalities).

Once the requesting device 160 (and the respective requester) is categorized or grouped within a particular geographic region (e.g., requester is determined to be in San Francisco, Calif.), the requester positioning 130 can determine which sub-region of the geographic region the requesting device 160 is located in (e.g., Mission District in San Francisco, Calif.) using the geographic data 151. The requester positioning 130 can provide position information 131 of the requesters and their current respective geographic regions (and sub-regions) to the map data generate 110.

Similarly, the provider positioning 140 can use the provider data 171 to determine, for a given geographic region, the number of available service providers in that geographic region and the current position information for each of a plurality of service providers that can provide the on-demand service in the given geographic region. In some examples, the provider positioning 140 can use the provider data 171 to identify only those service providers that are currently on-duty or available for servicing one or more requesters. Like the requester positioning 130, the provider positioning 140 can also use geographic data 151 to determine the position information 141 of the service providers and their current respective geographic regions (and sub-regions, if any) to the map data generate 110.

In some implementations, the requester positioning 130 can also forecast or predict, for a given geographic region and its sub-regions, the number of requesters and the position information of the requesters at a future instance in time (e.g., ten minutes ahead of the current time) or at a future window of time. The future instance in time or window of time can be configured by an administrator or user of system 100. The request positioning 130 can make the prediction based on (i) the current position information of the requesters determined from requester data 161, (ii) historical data 153 stored in the data store 150, and/or (iii) other external or third party information, such as current weather conditions, calendar information (e.g., seasons, holidays), event information within a given geographic region (e.g., concerts, sporting events), etc. The historical data 153 can include previously received position information of requesters in the given geographic region at different dates and/or times. The requester positioning 130 can use historical data 153 at a specific date and/or time that are comparable to the future instance in time when making the prediction.

For example, the current time can be 5:30 pm, but the requester positioning 130 can forecast the number of requesters and the position information of the requesters in San Francisco (the given geographic region) for 6 pm on a Friday evening. The requester positioning 130 can make the prediction for 6 pm on a Friday evening based on (i) the current position information of requesters in San Francisco determined from requester data 161, (ii) historical data 153 of requesters and their positions in San Francisco the past eight Fridays at 6 pm, and (iii) current weather conditions or forecasted weather conditions (e.g., it is currently raining so more people may want to stay in and not use transportation services). The forecasted position information 131 can be provided to the map data generate 110.

Similarly, in one example, the provider positioning 140 can also forecast or predict, for a given geographic region and its sub-regions, the number of available service providers and the position information of the service providers at a future instance in time (e.g., ten minutes ahead of the current time). Like the requester positioning 130, the provider positioning 140 can make the prediction based on (i) the current position information of the service providers determined from provider data 171, (ii) historical data 153 (about providers at a comparable time) stored in the data store 150, and/or (iii) other external or third party information. The forecasted number of parties to the service and their position information in a geographic region can be useful in determining whether a particular sub-region of the geographic region will be under-supplied or over-supplied at a later time. The requester positioning 130 and the provider positioning 140 can also store the respective data 161, 171 (e.g., time and position information of devices 160, 170) to the data store 150 as historical data for future use, as well as any determined or forecasted information.

The map data generate 110 can use the requester position information 131 and their associated sub-regions, and the provider position information 141 and their associated sub-regions to determine which sub-regions of a geographic region are under-supplied by service providers (or over-supplied). For example, for a given geographic region (such as San Francisco, Calif.), the map data generate 110 can use the requester positioning information 131 and geographic data 151 to determine the current number of requesters in each defined sub-region of San Francisco, Calif. The map data generate 110 can also use the provider position information 141 and geographic data 151 to determine the current number of available service providers in each sub-region of San Francisco. For each sub-region, the map data generate 110 can compare the number of requesters to available service providers in that sub-region to determine a ratio of requesters to available service providers (e.g., three-to-two, two-to-one, etc.).

In alternative examples, each of the requester positioning 130 and the provider positioning 140 can provide position information of the requesters 131 and position information of the providers 141 (such as described above) to the map data generate 110, but without determining the sub-regions the requesters and service providers are positioned in. In such examples, the requester positioning 130 and the provider positioning 140 provides the number of requesters and available service providers and their respective positions to the map data generate 110, but do not provide their associated sub-regions. Instead, the map data generate 110 can use the received position information 131, 141 and the geographic data 151 (which identifies sub-regions for a given geographic region) to determine, for each sub-region in the given geographic region, the number of requesters and available service providers in that sub-region.

Once the number of requesters and available service providers are determined for individual sub-regions in a given geographic region, the map data generate 110 can identify one or more sub-regions as being under-supplied or over-supplied as compared to one or more other sub-regions. In one example, if the determined ratio of requesters to available service providers for a sub-region is greater than or equal to a threshold ratio of requesters to available service providers (e.g., one-to-one), then the sub-region is determined to be under-supplied by service providers. On the other hand, if the determined ratio for a sub-region is less than the threshold ratio, then the sub-region is determined to be over-supplied. The sub-regions that are under-supplied can be mapped to a first color (green) that is distinguishable from a second color (red), which can be mapped to sub-regions that are over-supplied.

In other variations, for a given geographic region, the map data generate 110 can rank each of the sub-regions in order based on the determined ratio of requesters to available service providers. In another example, the map data generate 110 can categorize or group the sub-regions by the determined ratios so that a sub-region will belong to one of many groups, with each group having a range of ratios. The ranks and/or the categories can be color-coded or mapped to a spectrum of colors (e.g., two or more colors) that can represent which sub-regions are under-supplied as compared to one or more other sub-regions. For example, a mapping table can be used where a first ratio or first ratio range corresponds to the color green, a second ratio or second ratio range corresponds to the color yellow, a third ratio or third ratio range corresponds to the color orange, and a fourth ratio or fourth ratio range corresponds to the color red. Within the first ratio range, for example, different determined ratios for sub-regions can also be mapped to different shades of green (e.g., darker green for 3:1 compared to 3:2, which can be a lighter green).

The map data generate 110 can provide sub-region information 111 for a given geographic region to the device interface 120. In one or more examples, the sub-region information 111 can include, for each sub-region in a given geographic region, (i) the determined ratio of requesters to available service providers (or the actual numbers of requesters and available service providers), (ii) geographic information identifying and defining the sub-region (e.g., a plurality of location or GPS points that identify the sub-region) determined from geographic data 151, and/or (iii) visualization information associated with the ratio (e.g., colors or visual images).

The device interface 120 can provide the sub-region information for the plurality of sub-regions of a given geographic region as service information 125 to one or more requesting or provider devices 160, 170. In some examples, the device interface 120 can provide service information 125 of a particular geographic region to only those devices that are currently in the vicinity (e.g., within a predetermined distance) of the geographic region. For example, a service provider in New York City, N.Y., would not want on-demand service information of San Francisco, Calif. Information about the on-demand service can be provided on the display of one or more provider devices 170, for example, as part of a visualization that overlays or is a part of a map interface. In this manner, a service provider can use the visualized information, such as a heat map or other graphic overlay, to better position the vehicle (e.g., move to an under-supplied sub-region) in an area to increase business.

Similarly, in other examples, the map data generate 110 can use the forecasted requester position information 131 and/or the forecasted provider position information 141 to predict, at a future instance in time, which sub-regions of a geographic region will be under-supplied or over-supplied by service providers. In one scenario, it may be beneficial for service providers to visualize under-supplied or over-supplied sub-regions based on forecasted requester position information 131, but not current provider position information 141. In such cases, the ratio used to determine whether a sub-region is under-supplied as compared to other sub-regions can be based on the amount of predicted requesters at a future instance in time to the amount of currently available service providers. The visualization based on such a prediction can provide the service provider with additional time (e.g., ten minutes) to move or reposition the vehicle to a predicted under-supplied sub-region, for example, before the actual current number of requesters in the sub-region changes.

Still further, in one example, the map data generate 110 can determine sub-region information 111 (for a plurality of sub-regions of a given geographic region) for specific types of vehicles. For a transport service or delivery service, for example, service providers can drive different types of vehicles (e.g., town car, taxi cab, SUV, electric vehicle, van, limousine, shuttle, etc.) having different service capabilities (e.g., different capacities, trunk space amount, etc.) and different prices. The vehicle type and/or capabilities can be provided to the provider positioning 140 as part of the provider data 171. When the provider positioning 140 determines the number of available service providers and their positions within a given geographic region, the provider positioning 140 can also determine, for each of the available service providers in the geographic region, the vehicle type of the available service providers. Similarly, in some examples, the requester positioning 130 can determine specific vehicle preferences for the requesters in the given geographic region. The map data generate 110 can provide, as part of the sub-region information 111, (i) the vehicle types and/or capabilities of the available service providers in the given geographic region, and/or (ii) vehicle preferences or vehicle specific requests by requesters. By providing vehicle specific information to the provider devices 170, for example, a service provider can select to specifically view which sub-regions are over-supplied or under-supplied based on a type of vehicle.

Methodology

Figure 2:
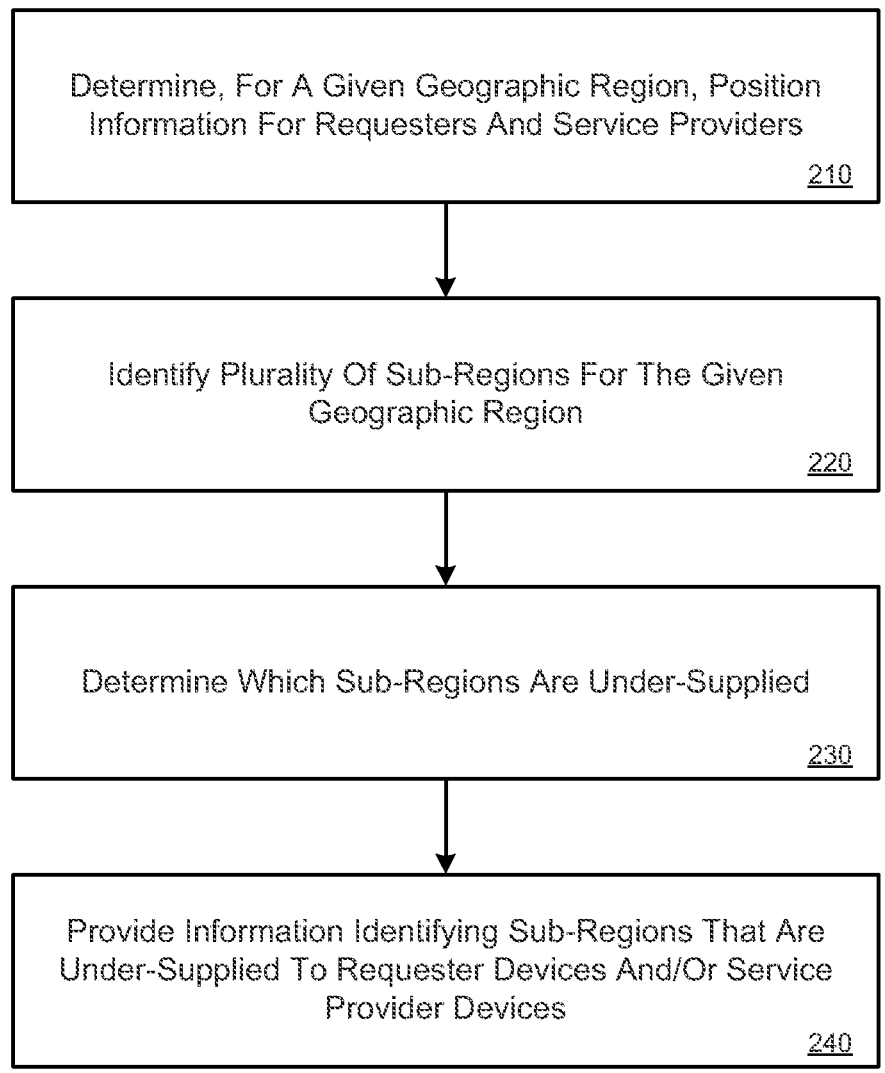
FIG. 2 illustrates an example method for providing on-demand service information.

FIG. 2 illustrates an example method for providing on-demand service information. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

For a given geographic region, position information for a plurality of requesters requesting an on-demand service (e.g., transport or delivery services, food trucks, etc.) and position information for a plurality of available service providers can be determined (210). Computing devices corresponding to requesters and service providers can communicate with system 100 in order to provide their respective current position information (e.g., GPS data) to system 100. For example, position information for requesters and position information for available service providers can be provided when a service application is launched or operated on the respective computing devices.

A plurality of sub-regions can be identified for the given geographic region (220). In some variations, the plurality of sub-regions can be identified from geographic data stored in a data store of system 100. The geographic data can include map data for different geographic regions and information about sub-regions for some (or all) of the different geographic regions. The geographic region can be divided into multiple sub-regions having any shape, geometry, or size. The sub-regions can be identified (i) arbitrarily, (ii) by an administrator of system 100, and/or (iii) by using predetermined information about certain geographic regions (e.g., some cities have districts that are well-known to the public, or are specifically named and identified by municipalities). For example, many large cities and metropolitan areas have pre-defined neighborhoods, boroughs, street boundaries that create regions, etc. Information of these neighborhoods and districts can be stored as geographic data in the data store. The information can also include position information (e.g., three or more GPS points) that represent points for the boundaries of the sub-regions for a given geographic region. In some examples, the sub-regions of a given geographic region can be identified to be non-overlapping sub-regions.

Depending on implementation, the plurality of sub-regions can be identified by, for example, the map data generate 110 of FIG. 1. For the given geographic region, the map data generate 110 can group or tally the number of requesters and available service providers in each of the plurality of sub-regions based on the position information of the requesters and the available service providers. In other examples, for the given geographic region, the requester positioning 130 and the provider positioning 140 can determine the position of the respective requesters and service providers, and identify which sub-region each requester and service provider are located in.

One or more sub-regions are determined to be under-supplied (or over-supplied) as compared to other sub-regions based on the position information of the requesters and the available service providers within a given geographic region (230). In one example, for each sub-region, system 100 can compare the number of requesters to available service providers in that sub-region to determine a ratio of requesters to available service providers (e.g., five-to-two, three-to-two, two-to-one, etc.). The ratio of requesters to available service providers can be compared to a threshold ratio of requesters to available service providers (e.g., one-to-one, or three-to-two). If the determined ratio is greater than or equal to the threshold ratio, the sub-region can be determined to be under-supplied, whereas if the determined ratio is less than the threshold ratio, the sub-region can be determined to be over-supplied. In some cases, no sub-regions may be determined to be under-supplied (or over-supplied).

There map data generate 110 can also use multiple threshold ratios (two or more thresholds) to determine which sub-regions are under-supplied and which sub-regions are over-supplied. For example, a first threshold ratio can identify whether a sub-region is under-supplied, while a second threshold ratio can identify whether a sub-region is over-supplied. In other examples, each of the sub-regions can be ranked in order based on the determined ratio of requesters to available service providers, and mapped to a spectrum of colors.

In another example, the sub-regions can be categorized or grouped by the determined ratios so that a sub-region will belong to one of many groups, with each group having a range of ratios. The groups can be color-coded or mapped to a spectrum of colors that can represent which sub-regions are under-supplied as compared to one or more other sub-regions. Depending on implementation, one or more sub-regions can be determined to be under-supplied or over-supplied by using a combination of a threshold, a ranking, and/or a categorization.

Information identifying the under-supplied one or more sub-regions can be provided to a plurality of service providers' devices and/or requesters' devices (240). In one example, information identifying the under-supplied (and/or over-supplied) sub-regions can enable a visualization to be provided as an overlay or as part of a map of the given geographic region. The information can also enable the sub-regions to be displayed using colors or graphics (e.g., based on the color spectrum or mapping table). The visualization provides an easily understandable feature to identify to service providers (e.g., that can have varying levels of language fluency), for example, which sub-regions of a geographic region are being under-supplied or under-served. The service provider can then reposition the vehicle to a better location for increased business.

In this manner, system 100 can increase the overall efficiency for an on-demand service system, such as a transport or delivery service system. System 100 can improve pick up times and reduce wait times for requesters. Underserved service areas can also be reduced as a result of service providers repositioning the vehicles in such areas.

User Interface Examples

Figure 3:
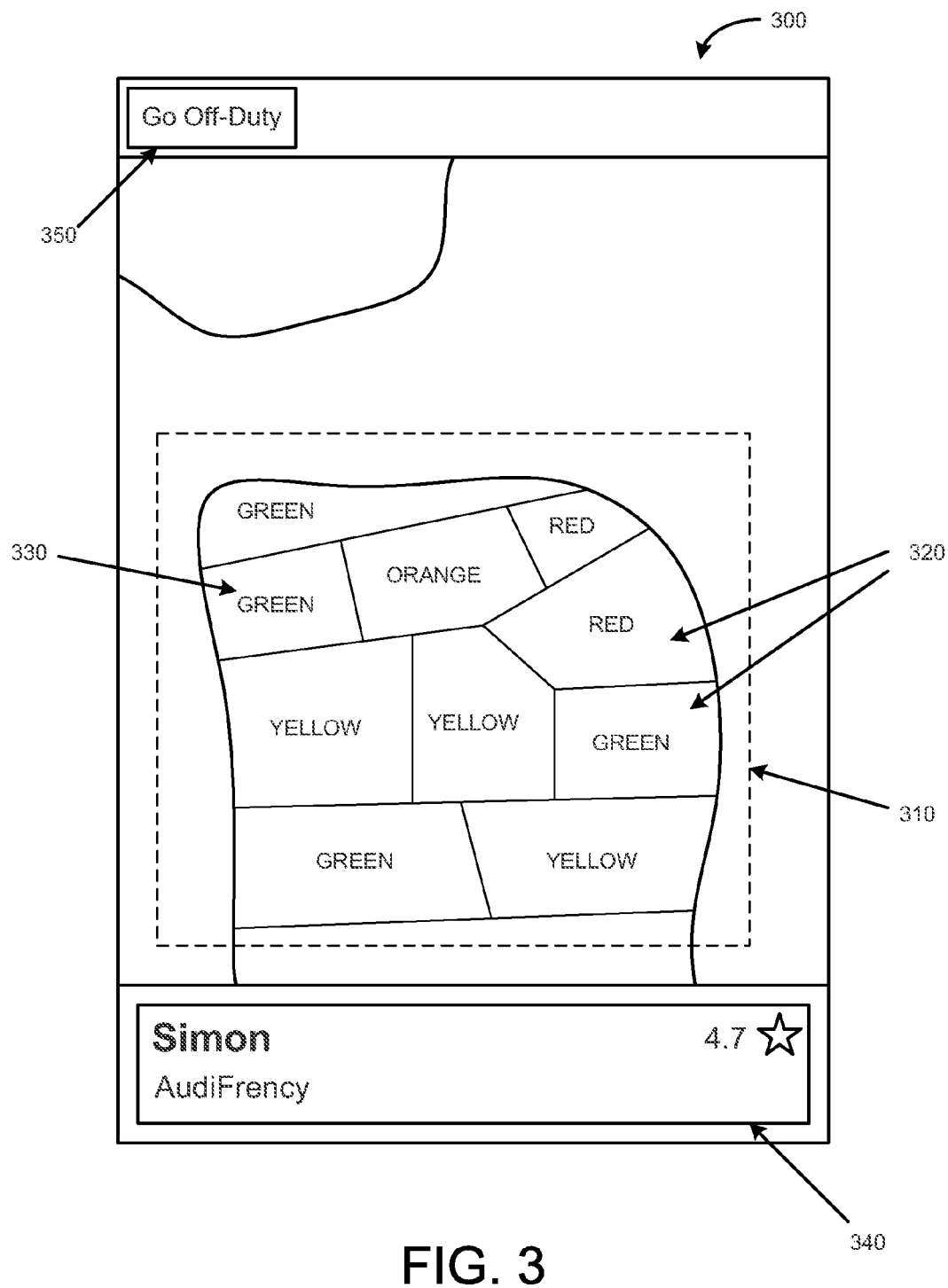
FIG. 3 illustrates an example user interface including on-demand service information that is provided to a computing device.
Figure 4:
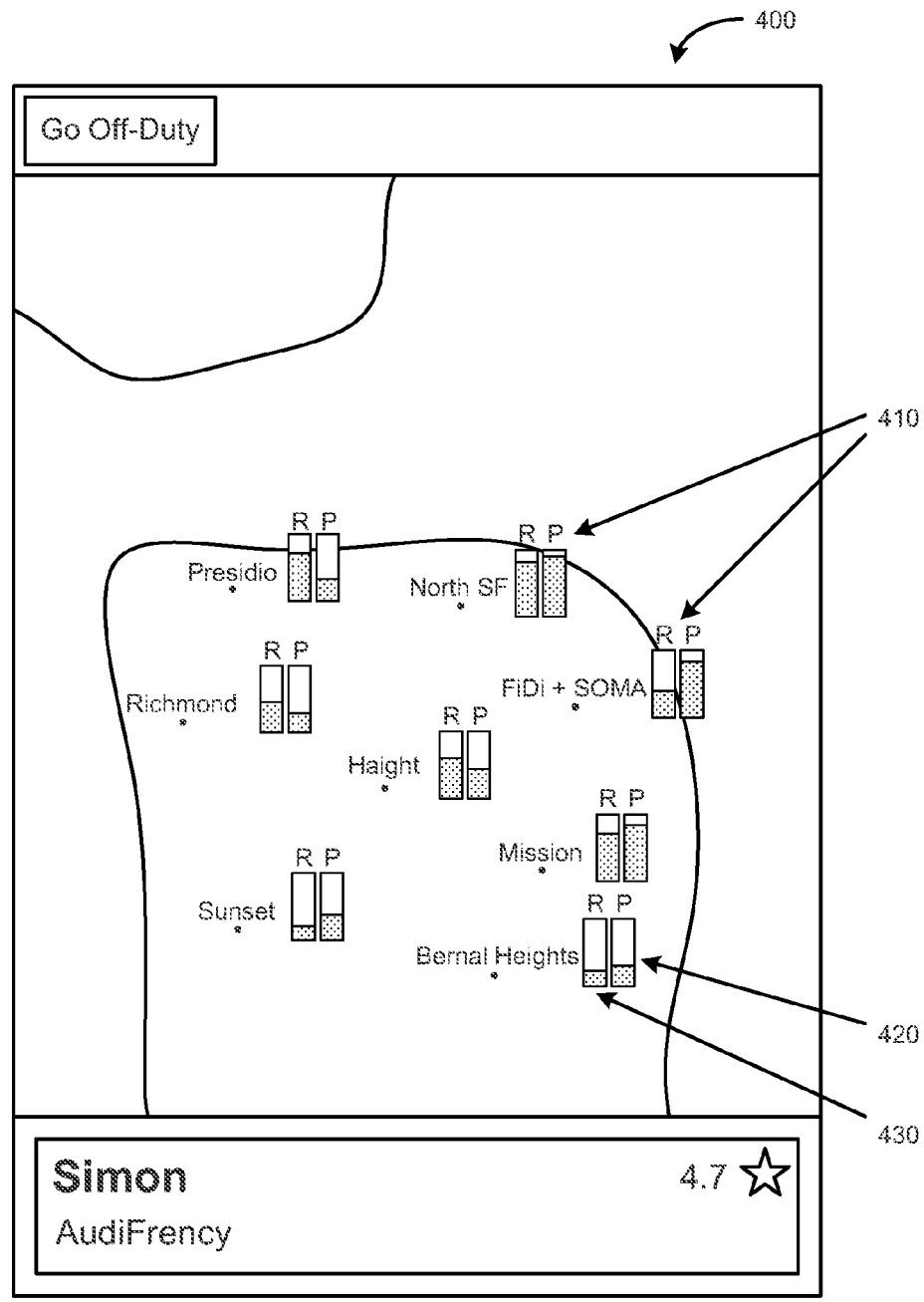
FIG. 4 illustrates another example user interface including on-demand service information that is provided to a computing device.

FIGS. 3 and 4 illustrate example user interfaces including on-demand service information that is provided to a computing device. The user interfaces 300, 400, respectively, illustrate user interfaces that can be provided by a service application running on a computing device of a requester or a provider. The user interfaces 300, 400 can be provided based on, for example, sub-region information provided by system 100. Such an application can be provided by an entity that enables an on-demand service (such as a transport service, a delivery service, a food truck service, etc.) to be arranged between parties. The service application can enable data to be exchanged between the service application (and computing device) and system 100 so that a user of the computing device can view on-demand service information provided by system 100.

The user interface 300 of FIG. 3 illustrates a visualization of on-demand service information in one example. The visualization can overlay or be part of a map of a given geographic region 310. The visualization can also identify a plurality of sub-regions 320 for the given geographic region 310, with each sub-region having an associated color 330. Each of the sub-regions 320 can be associated with a color 330 (e.g., based on a color spectrum and/or mapping table) that indicates to a service provider which areas or sub-regions are best for increasing business and revenue. A service provider, such as a driver that provides a transport service, can understand that red, for example, means that the sub-region is over-supplied (e.g., there are too many available service providers in the area), while green means that the sub-region is under-supplied (e.g., there are not enough available service providers in the area). Depending on the current location of the service provider, the service provider can choose to move to a sub-region 320 that is identified as being under-supplied.

For example, four colors are provided with the visualization in the user interface 300. The spectrum of colors can be in the order of green, yellow, orange, and red, where green represents the most under-supplied sub-region and red represents the least under-supplied sub-region (or the most over-supplied sub-region). In addition, different shadings of colors can be available to more precisely distinguish one green sub-region from another green sub-region. As discussed with respect to FIGS. 1 and 2, the visualization can provide the different sub-regions 320 and associated colors 330 based on a ratio of current requesters to currently available service providers, or for a predicted ratio of future requesters to currently available service providers.

The user interface 300 can include an identifier 340 of the service provider 340 and a selection feature 350 to enable the service provider to go off-duty. When the service provider goes off-duty, the service provider is no longer available to provider service in a given geographic area, and system 100 can dynamically update the position information for the service provider. For example, if the service provider was in sub-region A and went off-duty, the number of available service provider in sub-region A would decrease by one. The service provider can also interact with the user interface 300 to zoom in or zoom out to see additional details or more detailed and/or smaller sub-regions. Other selection features (not shown) can also enable the service provider to view visualization information based on a vehicle type.

The user interface 400 of FIG. 4 illustrates a visualization of on-demand service information in another example. The user interface 400 is similar to the user interface 300 of FIG. 3, but instead of sub-regions being identified using a color scheme, graphics 410 can be provided for individual sub-regions. In addition, each sub-region can be identified with a point (e.g., near the center of the sub-region) and a name for the sub-region.

The visualization of the user interface 400 enables a service provider to see a comparison of the number of requesters (R) and the number of available service providers (P) in a sub-region. An indicator 420 and an indicator 430 can be provided for each graphic 410. The service provider can see, from viewing the visualization, that the Presidio has a high number of requesters and a low number of providers (e.g., the Presidio is under-supplied by service providers) while North SF has a high number of requesters and a high number of providers (e.g., North SF is not under-supplied). In other examples, the graphic 410 can include a ratio or actual numbers that represent the numbers of requesters and service providers in the sub-region (e.g., 54/39). In one example, the ratio or actual numbers can replace the indicators 420, 430.

Hardware Diagrams

Figure 5:
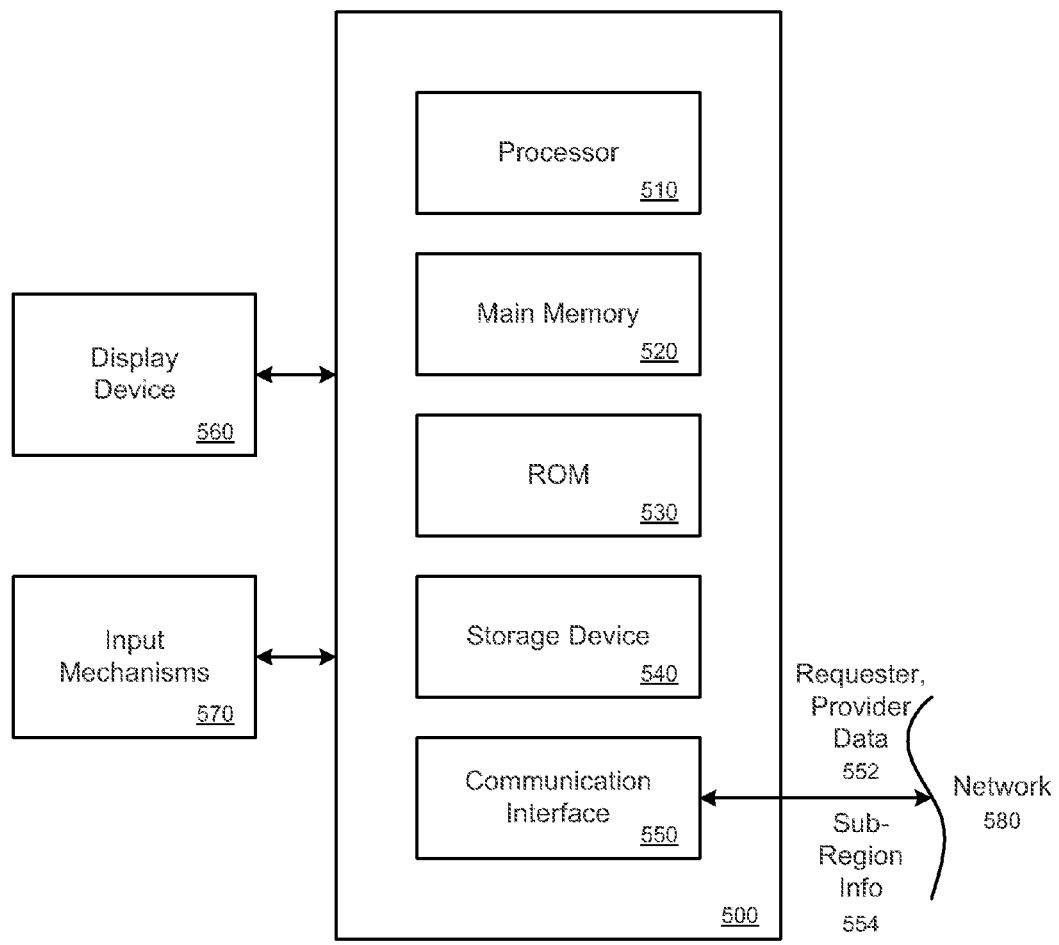
FIG. 5 is a block diagram that illustrates a computer system upon which examples described herein may be implemented.

FIG. 5 is a block diagram that illustrates a computer system upon which examples described herein may be implemented. For example, in the context of FIG. 1, system 100 may be implemented using a computer system such as described by FIG. 5. System 100 may also be implemented using a combination of multiple computer systems as described by FIG. 5.

In one implementation, computer system 500 includes processing resources 510, main memory 520, ROM 530, storage device 540, and communication interface 550. Computer system 500 includes at least one processor 510 for processing information. Computer system 500 also includes a main memory 520, such as a random access memory (RAM) or other dynamic storage device, for storing information and instructions to be executed by the processor 510. Main memory 520 also may be used for storing temporary variables or other intermediate information during execution of instructions to be executed by processor 510. Computer system 500 may also include a read only memory (ROM) 530 or other static storage device for storing static information and instructions for processor 510. A storage device 540, such as a magnetic disk or optical disk, is provided for storing information and instructions.

The communication interface 550 can enable the computer system 500 to communicate with one or more networks 580 (e.g., cellular network) through use of the network link (wireless or wireline). Using the network link, the computer system 500 can communicate with one or more computing devices and/or one or more servers. In some variations, the computer system 500 can be configured to receive requester data and/or provider data 552 from one or more computing devices (e.g., belonging to users and service providers, respectively) via the network link. The requester data and/or provider data 552 can be processed by the processor 510 and can be stored in, for example, the storage device 540. The processor 510 can process the received data (and other data, such as historical data) in order to determine one or more sub-regions of a given geographic region that is under-supplied by service providers. The sub-region information 554 can be transmitted to the requester device(s) and/or the provider device(s) over the network 580.

Computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to computer system 500 for communicating information and command selections to processor 510. Other non-limiting, illustrative examples of input mechanisms 570 include a mouse, a trackball, touch-sensitive screen, or cursor direction keys for communicating direction information and command selections to processor 510 and for controlling cursor movement on display 560.

Examples described herein are related to the use of computer system 500 for implementing the techniques described herein. According to one example, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
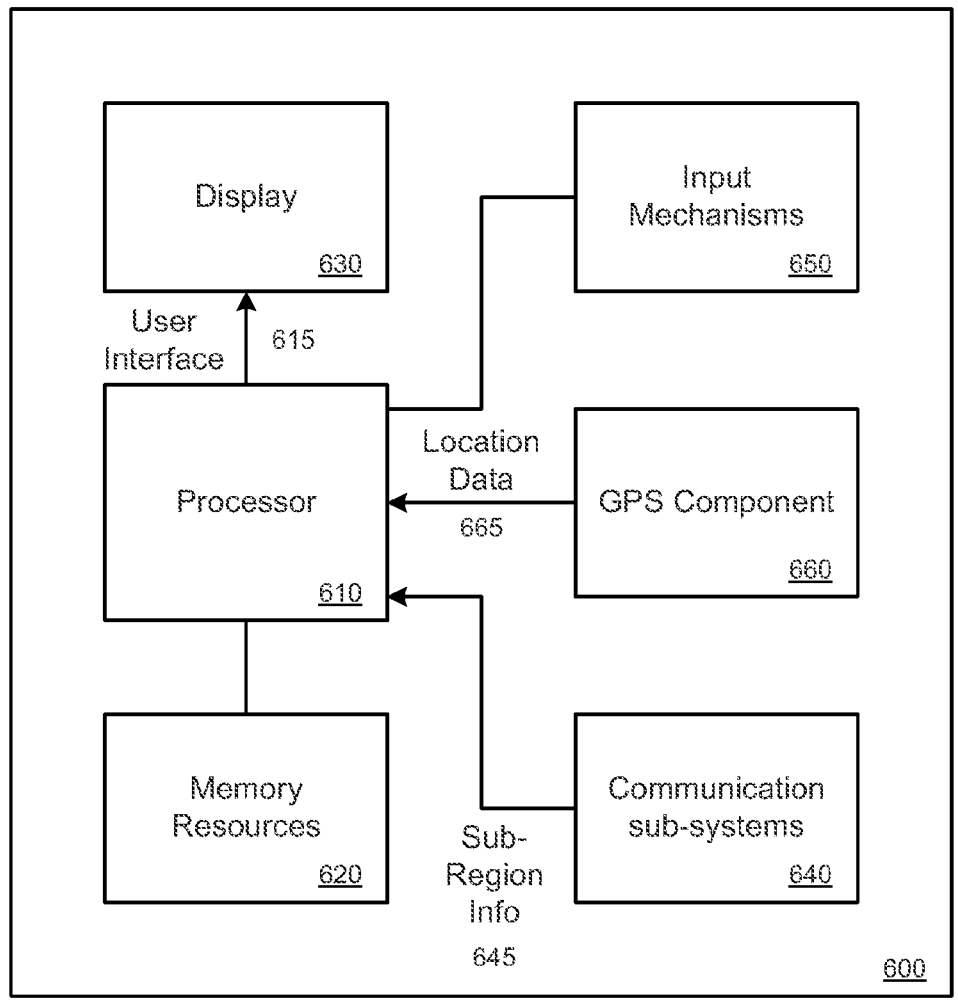
FIG. 6 is a block diagram that illustrates a mobile computing device upon which examples described herein may be implemented.

FIG. 6 is a block diagram that illustrates a mobile computing device upon which examples described herein may be implemented. In one example, a computing device 600 may correspond to a mobile computing device, such as a cellular device that is capable of telephony, messaging, and data services. Examples of such devices include smartphones, handsets or tablet devices for cellular carriers. Computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described with implementations, such as described by FIGS. 1 through 4, and elsewhere in the application. Processor 610 is configured, with instructions and data stored in the memory resources 620, to operate a service application, for example, as described in FIGS. 1 through 4. For example, instructions for operating the service application in order to display various user interfaces, such as described in FIGS. 3 through 4, can be stored in the memory resources 620 of the computing device 600. A requester or a service provider can operate the service application so that location data 665 can be determined by the GPS component 660. The location data 665 can provide the current location of the computing device 600 so that it can be used by system 100 (as described in FIG. 1). The communication sub-systems 640 can receive information 645 of one or more sub-regions of a given geographic region that is under-supplied by service providers over a network from system 100. The information can be provided to the processor 610 for displaying the information as part of the user interface 615.

The processor 610 can provide content to the display 630 by executing instructions and/or applications that are stored in the memory resources 620. In some examples, user interfaces 615 can be provided by the processor 610, such as a user interface for the service application (e.g., including a heat map user interface). While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A method for providing information for an on-demand service, the method being performed by a computing system and comprising:

receiving, by the computing system, user data from mobile computing devices that are operated by individuals, the user data being generated by a service application on a respective mobile computing device of each individual, wherein receiving user data includes receiving position information from the respective mobile computing device of each individual;

receiving, by the computing system, provider data from mobile computing devices that are operated by a group of service providers, the provider data being generated by a service application on a respective mobile computing device of each service provider in the group, wherein receiving provider data includes receiving position information from the respective mobile computing device of each service provider;

determining, based, at least in part, on the user data, (i) a user state of the mobile computing device of each individual, the user state indicating whether each individual is currently receiving the on-demand service, and (ii) a set of individuals who launched the service application within a designated duration of time that is deemed to be indicative of interest for requesting service within a given geographic region;

determining, based, at least in part on the provider data, a provider state of each service provider in the group that is within the given geographic region; and determining a supply level of the given geographic region based at least in part on (i) individuals other than those having the user state that indicates that the on-demand service is being received, (ii) the set of individuals, and (iii) the provider state of each service provider within the given geographic region.

2. The method of claim 1, further comprising:

providing, from the computing system to a set of mobile computing devices operated by a respective set of service providers in the group, information about the supply level of the given geographic region.

3. The method of claim 2, wherein the information about the supply level of the given geographic region can be used by the service application of each mobile computing device of the respective set of mobile computing devices to display content about the supply level of the given geographic region to the respective set of service providers.

4. The method of claim 2, wherein the provider state indicates whether each service provider is available to provide the on-demand service, and wherein determining the supply level of the given geographic region includes (i) determining a ratio of (a) a number of individuals in the set of individuals that do not have the user state that indicates that the on-demand service is being received, to (b) a number of service providers having the provider state that indicates availability to provide the on-demand service, and (ii) comparing the ratio to a threshold ratio.

5. The method of claim 2, wherein the information about the supply level of the given geographic region can be used by the service application of each mobile computing device of the respective set of mobile computing devices to display a visualization on or as part of a map user interface that includes the given geographic region.

6. The method of claim 5, wherein providing the information about the supply level of the given geographic region includes mapping the supply level to a corresponding visualization characteristic using a mapping table.

7. The method of claim 6, wherein the visualization characteristic corresponds to a color so that different supply levels are mapped to different colors.

8. A computing system comprising:

one or more network interfaces;

one or more processors;

one or more memory resources coupled to the one or more processors, the one or more memory resources storing instructions that, when executed by the one or more processors, cause the computing system to:

receive user data from mobile computing devices that are operated by individuals, the user data being generated by a service application on a respective mobile computing device of each individual, wherein receiving user data includes receiving position information from the respective mobile computing device of each individual;

receive provider data from mobile computing devices that are operated by a group of service providers, the provider data being generated by a service application on a respective mobile computing device of each service provider in the group, wherein receiving provider data includes receiving position information from the respective mobile computing device of each service provider in the group;

determine, based, at least in part, on the user data, (i) a user state of the mobile computing device of each individual, the user state indicating whether each individual is currently receiving an on-demand service, and (ii) a set of individuals who launched the service application within a designated duration of time that is deemed to be indicative of interest for requesting service from the on-demand service within a given geographic region;

determine, based at least in part on the provider data, a provider state of each service provider in the group that is within the given geographic region; and determine a supply level of the given geographic region based, at least in part on (i) individuals other than those having the user state that indicates that the on-demand service is being received, (ii) the set of individuals, and (iii) the provider state of each service provider within the given geographic region.

9. The computing system of claim 8, wherein the instructions cause the computing system to:
provide, from the computing system to a set of mobile computing devices operated by a respective set of service providers of the group, information about the supply level of the given geographic region.

10. The computing system of claim 9, wherein the information about the supply level of the given geographic region can be used by service applications on the mobile computing devices of the respective set of service providers to display content about the supply level of the given geographic region to the respective set of service providers.

11. The computing system of claim 9, wherein the provider state indicates whether each service provider is available to provide the on-demand service, and wherein the instructions cause the computing system to determine the supply level of the given geographic region by (i) determining a ratio of (a) a number of individuals in the set of individuals that do not have the user state that indicates that the on-demand service is being received, to (b) a number of service providers having the provider state that indicates availability to provide the on-demand service, and (ii) comparing the ratio to a threshold ratio.

12. The computing system of claim 9, wherein the information about the supply level of the given geographic region can be used by service applications on the mobile computing devices of the respective set of service providers to display a visualization on or as part of a map user interface that includes the given geographic region.

13. The computing system of claim 12, wherein the instructions cause the computing system to provide the information about the supply level of the given geographic region by mapping the supply level to a corresponding visualization characteristic using a mapping table.

14. The computing system of claim 13, wherein the visualization characteristic corresponds to a color so that different supply levels are mapped to different colors.

15. A method for providing information for an on-demand service, the method being performed by a computing system and comprising:

receiving user data from mobile computing devices that are operated by individuals in a given geographic region, the user data being generated by a service application on a respective mobile computing device of each individual, wherein receiving user data includes receiving position information from the respective mobile computing device of each individual;

receiving provider data from mobile computing devices that are operated by a group of service providers in the given geographic region, the provider data being generated by a service application on a respective mobile computing device of each service provider in the group, wherein receiving provider data includes receiving position information from the respective mobile computing device of each service provider;

identifying a plurality of sub-regions for the given geographic region;

for each sub-region:
determining, based, at least in part, on the user data, (i) a user state of the mobile computing device of each individual in that sub-region, the user state indicating whether each individual is currently receiving the on-demand service, and (ii) a set of individuals who launched the service application within a designated duration of time that is deemed to be indicative of interest for requesting service within that sub-region;

determining, based, at least in part, on the provider data, a provider state of each service provider in the group that is within that sub-region; and determining a supply level of that sub-region based, at least in part, on (i) individuals other than those having the user state that indicates that the on-demand service is being received, (ii) the set of individuals, and (iii) the provider state of each service provider within that sub-region.

16. The method of claim 15, wherein each of the plurality of sub-regions is identified using three or more location data points that define a boundary of that sub-region.

17. The method of claim 15, further comprising:
providing, from the computing system to a set of mobile computing devices operated by a respective set of service providers, information about the supply level of each of the sub-regions.

18. The method of claim 17, further comprising providing the information about the supply level of each of the sub-regions to one or more of the mobile computing devices of the respective set of service providers for use in displaying a visualization on or as part of a map user interface that includes the given geographic region.

19. The method of claim 18, wherein displaying the visualization includes displaying each of the sub-regions on the map user interface, and wherein providing the information about the supply level of each of the sub-regions includes mapping the supply level of each of the sub-regions to a corresponding visualization characteristic using a mapping table.

20. The method of claim 19, wherein the corresponding visualization characteristic of the supply level of each sub-region corresponds to a color, so that the supply level of two or more sub-regions that are different are mapped to different colors.

* * * * *